(12) United States Patent
Munkberg et al.

(10) Patent No.: US 11,967,024 B2
(45) Date of Patent: Apr. 23, 2024

(54) EXTRACTING TRIANGULAR 3-D MODELS, MATERIALS, AND LIGHTING FROM IMAGES

(71) Applicant: NVIDIA Corporation, Santa Clara, CA (US)

(72) Inventors: Carl Jacob Munkberg, Malmö (SE); Jon Niklas Theodor Hasselgren, Bunkeflostrand (SE); Tianchang Shen, Markham (CA); Jun Gao, North York (CA); Wenzheng Chen, Toronto (CA); Alex John Bauld Evans, London (GB); Thomas Müller-Höhne, Rheinfelden (DE); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 58 days.

(21) Appl. No.: 17/827,918

(22) Filed: May 30, 2022

(65) Prior Publication Data

US 2023/0140460 A1 May 4, 2023

Related U.S. Application Data

(60) Provisional application No. 63/275,088, filed on Nov. 3, 2021.

(51) Int. Cl.
*G06T 19/00* (2011.01)
*G06N 3/084* (2023.01)
(Continued)

(52) U.S. Cl.
CPC ........... *G06T 17/205* (2013.01); *G06N 3/084* (2013.01); *G06T 9/002* (2013.01); *G06T 15/04* (2013.01);
(Continued)

(58) Field of Classification Search
None
See application file for complete search history.

(56) References Cited

U.S. PATENT DOCUMENTS

| 6,484,305 B1* | 11/2002 | Syo | G06F 30/23 703/2 |
| 2009/0141026 A1* | 6/2009 | Raab | G06T 15/06 345/424 |

(Continued)

OTHER PUBLICATIONS

Bangaru, S., et al., "Systematically Differentiating Parametric Discontinuities," ACM Trans. Graph., 40 (107):107:1-107:17, 2021.
(Continued)

*Primary Examiner* — Joni Hsu
(74) *Attorney, Agent, or Firm* — Leydig, Voit & Mayer, Ltd.

(57) ABSTRACT

A technique is described for extracting or constructing a three-dimensional (3D) model from multiple two-dimensional (2D) images. In an embodiment, a foreground segmentation mask or depth field may be provided as an additional supervision input with each 2D image. In an embodiment, the foreground segmentation mask or depth field is automatically generated for each 2D image. The constructed 3D model comprises a triangular mesh topology, materials, and environment lighting. The constructed 3D model is represented in a format that can be directly edited and/or rendered by conventional application programs, such as digital content creation (DCC) tools. For example, the constructed 3D model may be represented as a triangular surface mesh (with arbitrary topology), a set of 2D textures representing spatially-varying material parameters, and an environment map. Furthermore, the constructed 3D model may be included in 3D scenes and interacts realistically with other objects.

25 Claims, 11 Drawing Sheets

(51) Int. Cl.
        G06T 9/00       (2006.01)
        G06T 15/04      (2011.01)
        G06T 15/50      (2011.01)
        G06T 17/20      (2006.01)
(52) U.S. Cl.
        CPC ............ G06T 15/506 (2013.01); G06T 19/00
                        (2013.01); G06T 2210/36 (2013.01)

(56)                    References Cited

U.S. PATENT DOCUMENTS

| | | | | |
|---|---|---|---|---|
| 2012/0081357 | A1* | 4/2012 | Habbecke | G06T 17/20 |
| | | | | 345/419 |
| 2015/0109415 | A1* | 4/2015 | Son | H04N 7/18 |
| | | | | 348/46 |
| 2016/0124117 | A1* | 5/2016 | Huang | G06T 17/05 |
| | | | | 703/2 |
| 2016/0364907 | A1* | 12/2016 | Schoenberg | G02B 27/017 |
| 2019/0026958 | A1* | 1/2019 | Gausebeck | G01S 17/89 |
| 2019/0147642 | A1* | 5/2019 | Cole | G06V 10/82 |
| | | | | 345/419 |
| 2019/0244423 | A1* | 8/2019 | Brettle | G06N 3/08 |
| 2019/0311529 | A1* | 10/2019 | Lacey | G06F 9/382 |
| 2020/0033880 | A1* | 1/2020 | Kehl | G01S 17/89 |
| 2021/0166411 | A1* | 6/2021 | Akdemir | G06T 7/593 |
| 2021/0400314 | A1* | 12/2021 | Varekamp | H04N 21/21805 |
| 2021/0406608 | A1* | 12/2021 | Levanony | G06F 17/16 |
| 2022/0319087 | A1* | 10/2022 | Zhang | G06T 13/80 |
| 2022/0358719 | A1* | 11/2022 | Cao | G06V 40/176 |

OTHER PUBLICATIONS

Boss, M., et al., "Nerd: Neural reflectance decomposition from image collections," In IEEE International Conference on Computer Vision (ICCV), 2021.
Burley, B., "Physically Based Shading at Disney," In SIGGRAPH Courses: Practical Physically Based Shading in Film and Game Production, 2012.
Cole, F., et al., "Differentiable Surface Rendering via Non-Differentiable Sampling," CoRR, abs/2108.04886, 2021.
Gao, J., et al., "Learning Deformable Tetrahedral Meshes for 3D Reconstruction," In Advances in Neural Information Processing Systems, 2020.
Hamilton, A.S., "Photogrammetry at embark," 2021, https://medium.com/embarkstudios/photogrammetry-at-embark-part-1-88142f2e036e.
Hasselgren, J., et al., "Appearance-driven automatic 3d model simplification," In Eurographics Symposium on Rendering, 2021.
Jatavallabhula, K.M., et al., "Kaolin: A PyTorch Library for Accelerating 3D Deep Learning Research," arXiv.1911.05063, 2019.
Jiang, Y., et al., "SDFDiff: Differentiable rendering of signed distance fields for 3d shape optimization," In the IEEE/CVF Conference on Computer Vision and Pattern Recognition (CVPR), Jun. 2020.
Kajiya, J., "The rendering equation," In Proceedings of the 13th Annual Conference on Computer Graphics and Interactive Techniques, SIGGRAPH '86, ACM Press, 1986.
Kallweit, S., et al., "The Falcor rendering framework," 2021, https://github.com/NVIDIAGameWorks/Falcor.
Karis, B., "Real shading in unreal engine 4," SIGGRAPH 2013 course: Physically Based Shading Theory and Practice, 2013.
Lagarde, S., et al., "Moving frostbite to physically based rendering 3.0," SIGGRAPH 2014 course: Physically Based Shading in Theory and Practice, 2014.
Laine, S., et al., "Modular primitives for high-performance differentiable rendering," ACM Transactions on Graphics, 39(6), 2020.
Li, T.M., et al., "Differentiable Monte Carlo Ray Tracing through Edge Sampling," ACM Trans. Graph. (Proc. SIGGRAPH Asia), 37(6):222:1-222:11, 2018.
Liao, Y., et al., "Deep Marching Cubes: Learning Explicit Surface Representations," In Conference on Computer Vision and Pattern Recognition (CVPR), 2018.
Lorensen, W., et al., "Marching Cubes: A High Resolution 3D Surface Construction Algorithm," 21(4):163-169, 1987.
Luan, F., et al., "Unified shape and SVBRDF recovery using differentiable monte carlo rendering," arXiv, 2021.
Mildenhall, B., et al., "NeRF: Representing Scenes as Neural Radiance Fields for View Synthesis," In ECCV, 2020.
Nimier-David, M., et al., "Mitsuba 2: A Retargetable Forward and Inverse Renderer," ACM Trans. Graph., 38(6), 2019.
Dechsle, M., et al., "UNISURF: unifying neural implicit surfaces and radiance fields for multi-view reconstruction," CORR, abs/2104.10078, 2021.
Paszke, A., et al., "Automatic differentiation in PyTorch," In NIPS-W, 2017.
Ravi, N., et al., "Accelerating 3D Deep Learning with PyTorch3D," arXiv:2007.08501, 2020.
Schonberger, J., et al., "Structure-from-motion revisited," In Conference on Computer Vision and Pattern Recognition (CVPR), 2016.
Schonberger, J., et al., "Pixelwise view selection for unstructured multi-view stereo," In European Conference on Computer Vision (ECCV), 2016.
Shen, F., et al., "Deep Marching Tetrahedra: a Hybrid Representation for High-Resolution 3D Shape Synthesis," CORR, 2021.
Valentin, J., et al., "TensorFlow Graphics: Computer Graphics Meets Deep Learning," 2019.
Walter, B., et al., "Microfacet Models for Refraction through Rough Surfaces," In Proceedings of the 18th Eurographics Conference on Rendering Techniques, pp. 195-206, 2007.
Wang, P., et al., "NeuS: Learning neural implicit surfaces by volume rendering for multi-view reconstruction," NeurIPS, 2021.
Yariv, L., et al., "Multiview Neural Surface Reconstruction by Disentangling Geometry and Appearance," Advances in Neural Information Processing Systems, 33, 2020.
Young, J., "Xatlas," 2021, https://github.com/jpcy/xatlas.
Zhang, K., et al., "PhySG: Inverse Rendering with Spherical Gaussians for Physics-based Material Editing and Relighting," In the IEEE/CVF Conference on Computer Vision and Pattern Recognition (CVPR), 2021.
Zhang, X., et al., "NeR-Factor: Neural Factorization of Shape and Reflectance Under an Unknown Illumination," CORR, abs/2106.01970, 2021.

* cited by examiner

EXTRACTING TRIANGULAR 3-D MODELS, MATERIALS, AND LIGHTING FROM IMAGES

CLAIM OF PRIORITY

This application claims the benefit of U.S. Provisional Application No. 63/275,088 titled "EXTRACTING TRIANGULAR 3D MODELS, MATERIALS, AND LIGHTING FROM IMAGES," filed Nov. 3, 2021, the entire contents of which is incorporated herein by reference.

BACKGROUND

Creation of three-dimensional (3D) content is a challenging, mostly manual task which requires both artistic modeling skills and technical knowledge. Efforts to automate 3D modeling can save substantial production costs or allow for faster and more diverse content creation. Photogrammetry is a popular technique to assist in this process, where multiple photos of an object are converted into a 3D model. Game studios leverage photogrammetry to quickly build highly detailed virtual landscapes. However, photogrammetry is a multi-stage process, including multi-view stereo to align cameras and find correspondences, geometric simplification, texture parameterization, material baking and relighting. The complex photogrammetry pipeline has many steps with conflicting optimization goals and errors that propagate between stages. Artists often rely on a plethora of software tools and significant manual adjustments to reach the desired quality of the final 3D model. There is a need for addressing these issues and/or other issues associated with the prior art.

SUMMARY

Embodiments of the present disclosure relate to extracting triangular 3D models, materials, and lighting from images. Systems and methods are disclosed that provide an efficient method for joint optimization of topology, materials and lighting from multi-view image observations. In contrast to conventional multi-view reconstruction approaches, which typically produce entangled 3D representations encoded in neural networks, the extracted 3D models that include triangle meshes with spatially-varying materials and environment lighting can be deployed in traditional graphics engines unmodified. The extracted 3D models may be used in advanced scene editing, material decomposition, and high-quality view interpolation, all running at interactive rates in triangle-based renderers (rasterizers and path tracers).

A method, computer readable medium, and system are disclosed for extracting a 3D model. In an embodiment, the method includes receiving images of an object in an environment, constructing a triangular mesh topology for the 3D model of the object according to topology parameters, and rendering the triangular mesh topology to produce rendered images of the 3D model. In an embodiment, the rendering comprises accessing spatially-varying material parameters for the 3D model using world space coordinates and computing lighting for the 3D model using environment lighting parameters. The method also includes computing image space losses based on the images and the rendered images and updating the topology parameters according to the image space losses to modify the triangular mesh topology. In an embodiment, only the world space coordinates are used to access the spatially-varying material parameters for construction of the 3D model. In an embodiment, after the triangular mesh topology has converged, the 3D model is reparameterized and texture coordinates are used (instead of the world space coordinates) to access the spatially-varying material parameters during optimization of the 3D model.

BRIEF DESCRIPTION OF THE DRAWINGS

The present systems and methods for extracting triangular 3D models, materials, and lighting from images are described in detail below with reference to the attached drawing figures, wherein.

DETAILED DESCRIPTION

Systems and methods are disclosed related to extracting or constructing triangular 3D models, materials, and lighting from images. Extraction of a 3D model may be framed as an inverse rendering task and, driven by the quality of rendered images of the reconstructed 3D model compared to the captured input imagery, extraction of the 3D model components may be jointly optimized. Conventional techniques combine 3D reconstruction with neural rendering to provide high quality novel view synthesis. However, these conventional techniques typically produce representations that entangle geometry, materials, and lighting into neural networks, and thus cannot easily support scene editing operations. Furthermore, to use a 3D model in traditional graphics engines, one needs to extract geometry from the neural network which may result in poor surface quality, particularly at low triangle counts. Also, materials encoded in neural networks cannot easily be edited or extracted in a form compatible with traditional game engines. In contrast, the reconstructed triangular 3D models extracted from multiple 2D images using the techniques described further herein, are compatible with traditional graphics engines and support relighting and scene editing.

Figure 1A:
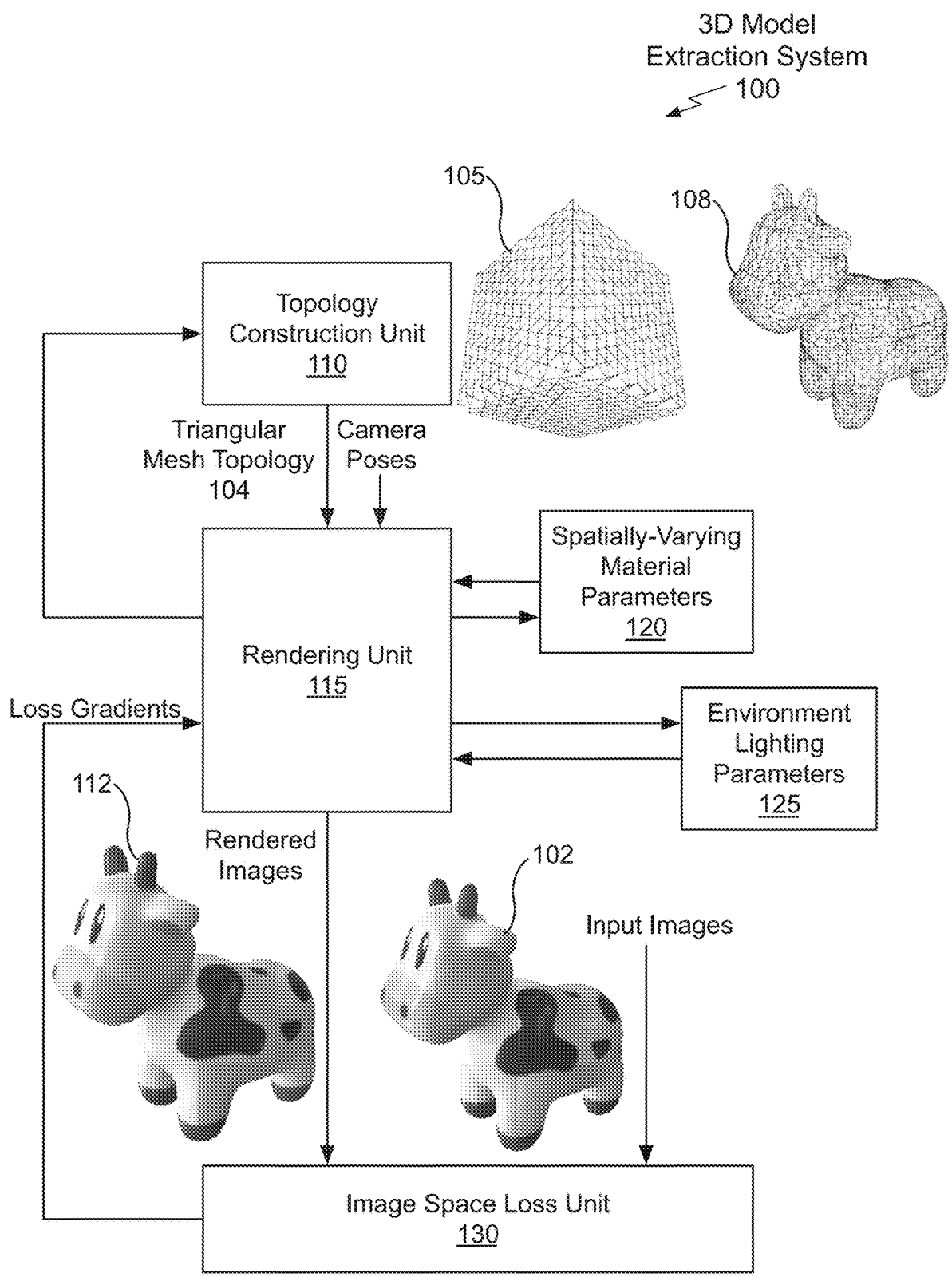
FIG. 1A illustrates a block diagram of an example 3D model extraction system suitable for use in implementing some embodiments of the present disclosure.

FIG. 1A illustrates a block diagram of an example 3D model extraction system 100 suitable for use in implementing some embodiments of the present disclosure. The 3D model extraction system 100 includes a topology construction unit 110, a rendering unit 115, spatially-varying material parameters 120, environment lighting parameters 125, and an image space loss unit 130. The constructed 3D model comprises several components including a triangular surface mesh (with arbitrary topology), a set of 2D textures representing spatially-varying material parameters, and an environment map. Construction of the 3D model is supervised by multi-view input images of an object illuminated under one unknown environment lighting condition, together with associated camera poses.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D model extraction system 100 is within the scope and spirit of embodiments of the present disclosure.

The extraction process begins with an initial geometric mesh 105 that is uniform and has a resolution based on the desired accuracy of the 3D model to be constructed. The topology construction unit 110 generates a triangular mesh topology 104 according to topology parameters that are learned. As the topology construction unit 110 learns the topology of the 3D model, the initial geometric mesh 105 is iteratively modified according to the topology parameters to produce a final triangular mesh topology 108. In an embodiment, the initial geometric mesh 105 is a tetrahedral grid with per-vertex 3D positions and 1D signed-distance field (SDF) values. Each SDF value defines a distance to the reconstructed surface of the triangular mesh topology 104 and the SDF values may be initialized to random values. In an embodiment, the topology parameters comprise the SDF values. In an embodiment, when the initial geometric mesh 105 is an SDF, the SDF is converted into the triangular mesh topology 104 defining a 3D surface using the Marching Tetrahedron technique, which, based on the SDF values, produces zero, one, or two triangles for each tetrahedron in the initial geometric mesh 105. More specifically, signs of the SDF values at the corners of each tetrahedron determine whether the tetrahedron is converted into zero, one, or two triangles. The conversion happens at every training iteration. In an embodiment, in addition to the SDF values, vertex offsets are used to warp the vertex positions and are initialized to zero. In an embodiment, the topology parameters comprise the SDF values, the vertex offsets, and the vertices. During optimization, the topology parameters are updated based on loss gradients, hence, the initial geometric mesh 105 and triangular mesh topology 104 are updated in each iteration. In an embodiment, the topology parameter updates comprise changes for the SDF values and the vertex offsets. In an embodiment, vertices defining the initial geometric mesh 105 are fixed and, during optimization, vertex offsets (e.g., displacement vectors) assigned to each vertex are updated via backpropagation. Use of the fixed vertices for the initial geometric mesh 105 combined with offsets constrains the optimization by allowing small displacements, typically in the range of half a grid cell. In contrast, directly optimizing the vertices of the initial geometric mesh 105 may cause the triangular mesh topology 104 to collapse or fold.

The triangular mesh topology 104 generated by the topology construction unit 110 may be rendered by a "standard" differentiable rasterizer, such as the rendering unit 115. The triangular mesh topology 104 is rendered, according to the camera pose associated with the input image, using the initial materials and environment lighting to produce a rendered image. In an embodiment, the rendering unit 115 is a differentiable rasterizer with deferred shading. Appearance driven optimization is employed to jointly learn scene parameters defining the triangular mesh topology 104, the spatially-varying material parameters 120, and the environment lighting parameters 125. More specifically, topology parameters may be adjusted, causing triangles to be removed or additional triangles to be inserted to construct the final triangular mesh topology 108 representing a surface of the 3D model.

The image space loss unit 130 compares rendered images, such as rendered image 112, output by the rendering unit 115 with corresponding input images, such as input image 102. The image space loss unit 130 computes loss gradients to reduce differences between the rendered images and the input images. The loss gradients are back-propagated through the operations performed by the differential rendering unit to modify (update) the topology parameters used by the topology construction unit 110 and the spatially-varying material parameters 120 and environment lighting parameters 125. In an embodiment, a combination of the topology parameters, the spatially-varying material parameters 120 and environment lighting parameters 125 comprise scene parameters. The optimization task explicitly renders triangle meshes, while robustly handling arbitrary topology. Hence, unlike conventional solutions using neural implicit surface or volumetric representations, the target shape representation (e.g., triangular surface mesh) is directly optimized.

The material parameters may comprise a volumetric texture that maps a world space position to a base color, specular characteristics, and a normal vector perturbation. In an embodiment, a neural network is used to encode a compact representation of the volumetric texture. In an embodiment, the neural network includes a multilayer perceptron (MLP). In an embodiment, once the triangular mesh topology 104 and texture have converged through training, the neural network may be sampled on the surface of the triangular mesh topology 104 to encode the material parameters in a 2D surface texture. The 2D surface texture may continue to be refined through appearance driven optimization. In an embodiment, once the triangular mesh topology 104 has converged, the SDF is no longer converted and the triangular mesh topology 104 is optimized directly.

The environment lighting parameters 125 may be learned using a differentiable split sum approximation technique to encode the environment lighting parameters 125 as a base map storing an integral of the specular bidirectional scattering distribution function (BSDF) and integrals of the incoming radiance with the specular normal distribution function (NDF). Separation of the environment lighting parameters 125 from the spatially-varying material parameters 120 enable relighting of the 3D model by modifying the environment lighting parameters 125 while maintaining the spatially-varying material parameters 120 to produce images with different kinds of lighting configuration. Conversely, the spatially-varying material parameters 120 may be changed while the environment lighting parameters 125 are held constant.

In an embodiment, a foreground segmentation mask or depth field may be provided as an additional supervision input with each 2D image. In an embodiment, the foreground segmentation mask or depth field is automatically generated for each 2D image. Additionally, versions of the 3D model may be constructed at different resolutions to provide level-of-detail (LOD) 3D models for improved image quality for images rendered using the 3D model. More specifically, the LOD 3D models may be used to produce alias-free images, even when rendered using only one sample per pixel. Real-time and/or production rendering applications (e.g., feature film, architectural visualization, etc.) may benefit from the improved image quality.

The constructed 3D model is represented in a format that can be directly edited and/or rendered by conventional application programs, such as digital content creation (DCC) tools. Furthermore, the constructed 3D model may be included in 3D scenes and interacts realistically with other objects. In contrast, machine-learning techniques for 3D reconstruction use volume rendering or sphere-tracing, and hence, produce representations in a format that cannot be directly rendered by existing applications and may not be suitable for real-time rendering. Conventional manual techniques may be used to construct 3D models that can be rendered by existing applications, but the manual process relies on human artists and is therefore time consuming. Most current 3D model reconstruction techniques relying on multi-view images typically do not recover the environment lighting or disentangle the environmental lighting from the materials.

In sum, the 3D model extraction system 100 learns a topology and vertex positions defining a triangular surface mesh without requiring any initial guess for the 3D geometry. The differentiable 3D model is based on a deformable tetrahedral mesh, that is extended to support spatially-varying materials and high dynamic range (HDR) environment lighting. In an embodiment, over 50,000,000 scene parameters that define the geometry, materials and lighting are jointly optimized using the input images and associated camera poses. The resulting 3D model can be deployed without conversion on any device supporting triangle rendering, including phones and web browsers, and renders at interactive rates. The extracted 3D models may be used in advanced scene editing, material decomposition, and high-quality view interpolation, all running at interactive rates in triangle-based renderers (e.g., rasterizers and path tracers).

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

As previously described, the 3D model extraction system 100 optimizes the parameters based on image space differences. Let $\phi$ denote the optimization parameters (i.e., scene parameters including SDF values and vertex offsets representing the shape, spatially-varying material, and light probe parameters). For a given camera pose, c, the differentiable renderer produces an image $I_\phi(c)$. The reference (input) image $I_{ref}(c)$ is a view from the same camera. Given a loss function L, the empirical risk is minimized:

$$\mathrm{argmin}_\phi \mathbb{E}_c[L(I_\phi(c), I_{ref}(c))] \qquad \text{eq. (1)}$$

using Adam, as described by Diederik P. Kingma and Jimmy Ba. in "Adam: A Method for Stochastic Optimization," in *Proceedings of the 3rd International Conference for Learning Representations*, 2015. The loss function is minimized based on gradients w.r.t. the optimization parameters, $\partial L/\partial \phi$, which are obtained through differentiable rendering. The rendering unit 115 uses physically based shading and produces rendered images with high dynamic range. Therefore, the objective function must be robust to the full range of floating-point values. The loss function is $L=L_{image}+L_{mask}+L_{reg}$, an image space loss, $L_{image}$ ($L_1$ norm on tone mapped colors), a mask loss, $L_{mask}$ (squared $L_2$ when an additional supervision input comprises a foreground segmentation mask) and a regularizer $L_{reg}$ (see equation (2)) to improve geometry.

For performance reasons, the rendering unit 115 may be a differential rasterizer with deferred shading, in which case reflections, refractions (e.g., glass), and translucency are not supported. In an embodiment, during optimization, the rendering unit 115 only renders direct lighting without shadows. In an embodiment, the shading model uses a diffuse Lambertian lobe and a specular, isotropic microfacet GGX lobe, which is commonly used in modern game engines. Both dielectrics and metal materials may be supported by the rendering unit 115. The loss is back-propagated via the loss gradients to update the optimization parameters defining the 3D model, enabling direct optimization of the triangular surface mesh and rendered appearance end-to-end. To avoid discretization error issues in the 3D model, triangle meshes are explicitly rendered during optimization rather than rendering a volumetric representation. Quantization artifacts may be introduced when optimization is performed using a volume renderer and a final volumetric representation is converted into a triangle mesh for use by an application. Converting volumetric and implicit shape representations (e.g., SDFs) to meshes through iso-surface extraction, such as Marching Cubes inevitably imposes discretization errors. As a result, the output mesh quality, particularly at the moderate triangle counts typically used in real-time rendering, is often not sufficient. Similarly, simplifying dense extracted meshes using decimation tools may introduce errors in rendered appearance. Explicitly rendering the triangular mesh topology 104 by the rendering unit 115 during optimization avoids these issues.

Given a tetrahedral grid (as the initial geometric mesh 105) with vertex positions v, SDF values, s, and deformation vectors $\Delta v$ are learned. The SDF values and deformations can either be stored explicitly as values per grid vertex, or implicitly when the topology construction unit 110 is implemented as a neural network. At each optimization iteration, the SDF is first converted to a triangular surface mesh using marching tetrahedra, which is shown to be differentiable w.r.t. SDF and can change surface topology. Next, the extracted triangular mesh topology 104 is rendered by the rendering unit 115 using a differentiable rasterizer to produce a rendered image, and image-space loss gradients that are back-propagated to the SDF values and offsets (or network weights). A neural SDF representation can act as a smoothness prior, which can be beneficial in producing well-formed shapes. Directly optimizing per-vertex attributes, on the other hand, can capture higher frequency detail and is typically faster to train. In practice, the optimal choice of parametrization depends on the ambiguity of geometry in multi-view images.

In an embodiment, to reduce floaters and internal geometry, the SDF values are regularized. Given the binary cross-entropy H, sigmoid function σ, and the sign function sign (x), the regularizer may be defined as $$L_{reg} = \Sigma_{i,j \in \mathbb{S}_e} H(\sigma(s_i), \text{sign}(s_j)) + H(\sigma(s_j), \text{sign}(s_i)), \quad \text{eq. (2)}$$

$L_{reg}$ is computed by summing over the set of unique edges, $\mathbb{S}_e$, in the tetrahedral grid, for which $\text{sign}(s_i) \neq \text{sign}(s_j)$. Intuitively, the number of sign flips of s is reduced and the mesh surface is simplified, thus penalizing internal geometry or floaters.

Figure 1B:
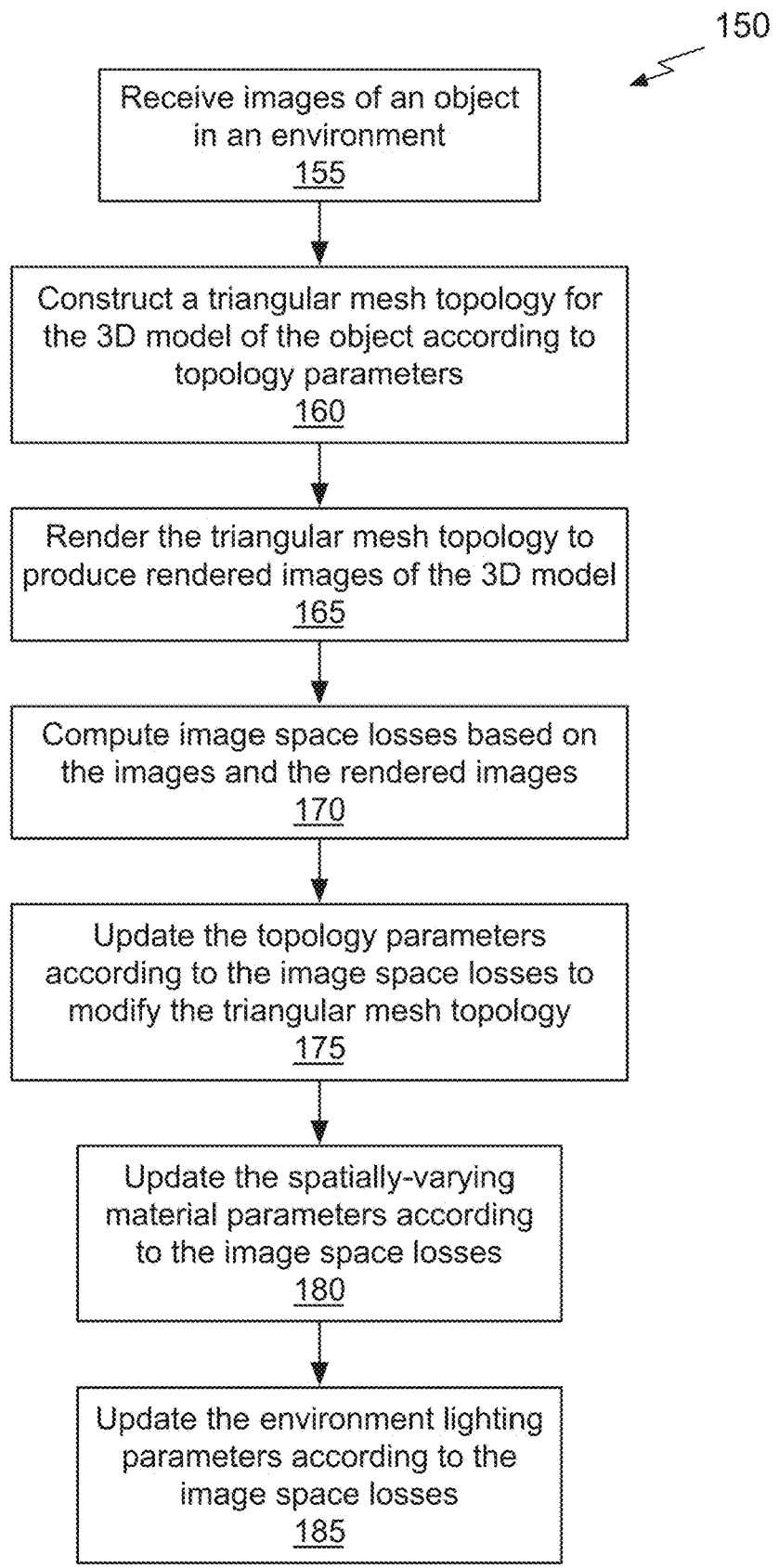
FIG. 1B illustrates a flowchart of a method for 3D model extraction suitable for use in implementing some embodiments of the present disclosure.

FIG. 1B illustrates a flowchart of a method for 3D model extraction suitable for use in implementing some embodiments of the present disclosure. Each block of method 150, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 150 is described, by way of example, with respect to the system of FIG. 1A. However, this method may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

The method 150 is an efficient inverse rendering technique capable of extracting triangular meshes of unknown topology, with spatially-varying materials and lighting from multi-view images. In an embodiment, the object for which the 3D model is extracted is assumed to be illuminated under one unknown environment lighting condition and that corresponding camera poses for the input images of the object are available.

At step 155, images of an object in an environment (e.g., 3D scene) are received. In an embodiment, the images are captured in the real world and do not include synthesized objects or a synthesized environment. At step 160, a triangular mesh topology is constructed for the 3D model of the object according to topology parameters. In an embodiment, the triangular mesh topology is constructed from an initial geometric grid with per-vertex SDF values set to random values. In an embodiment, the initial geometric grid is a tetrahedral grid. In an embodiment, an additional supervision input corresponding to the object is provided for each image of the images and used to construct the triangular mesh topology for the 3D model of the object. In an embodiment, the additional supervision input comprises one of a foreground segmentation mask or a depth field.

At step 165, the triangular mesh topology is rendered to produce rendered images of the 3D model. In an embodiment, at least steps 160 and 165 are repeated using additional images of the object in the environment at a different pixel resolution compared with the images to construct a version of the 3D model at an additional resolution. In an embodiment, the rendering comprises accessing spatially-varying material parameters for the 3D model using world space coordinates and computing lighting for the 3D model using environment lighting parameters. In an embodiment, only the world space coordinates are used to access the spatially-varying material parameters. In an embodiment, the 3D model is refined through further optimization and texture coordinates are used instead of the world space coordinates to access the spatially-varying material parameters. In an embodiment, the spatially-varying material parameters are encoded by a neural network. In an embodiment, the environment lighting parameters comprise integrals of diffuse and specular bidirectional scattering distribution function and integrals of incoming radiance associated with lighting directions.

At step 170, image space losses are computed based on the images and the rendered images. In an embodiment, the rendered images are generated by a differentiable renderer and the image space losses are propagated backwards through the differentiable renderer operations to update the topology parameters. In an embodiment, updating the topology parameters causes at least one triangle to be removed from or inserted into the triangular mesh topology. At step 175, the parameters are updated according to the image space losses to modify the triangular mesh topology. At step 180, the spatially-varying material parameters are updated according to the image space losses. At step 185, the environment lighting parameters are updated according to the image space losses.

In an embodiment, after the topology parameters and the spatially-varying material parameters are converged, the spatially-varying material parameters are sampled on a surface of the triangular mesh topology to generate 2D texture maps that replace the neural network. In an embodiment, the triangular mesh topology is rendered using the 2D texture maps to produce additional rendered images of the 3D model. In an embodiment, once the triangular mesh topology converted from the tetrahedral grid is converged and the surface texture is converged, a neural network representation of the triangular mesh topology is converted to an optimized triangular mesh topology. The triangular mesh topology may continue to be refined directly through appearance driven optimization instead of continuing to optimize the tetrahedral grid or neural network representation.

Figure 2A:
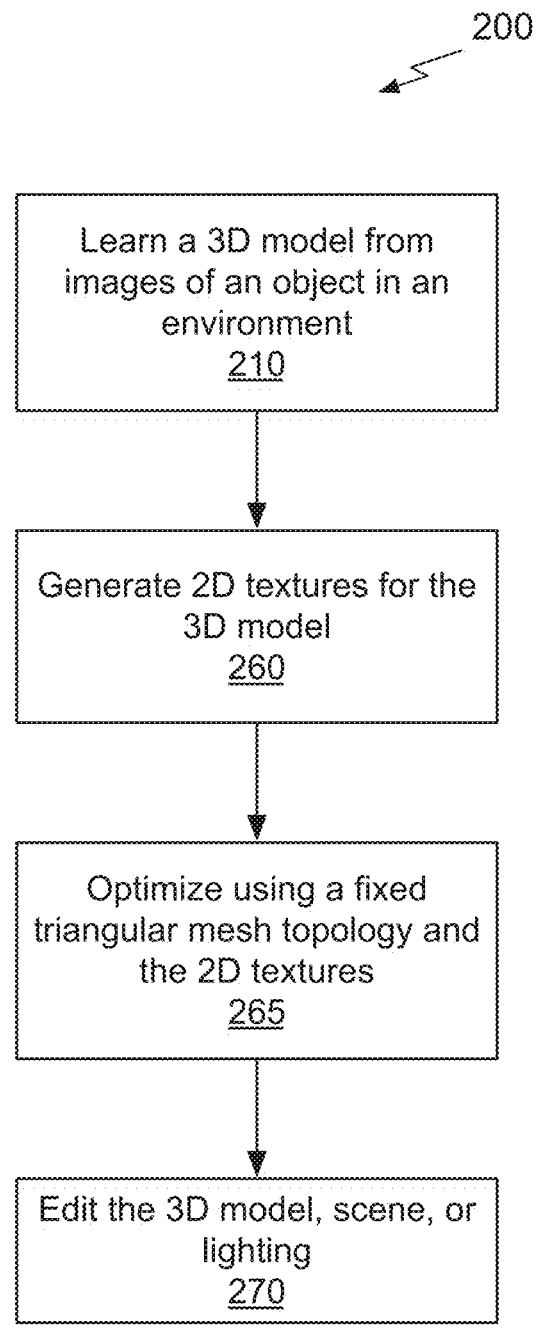
FIG. 2A a flowchart of a method for optimizing and editing an extracted 3D model suitable for use in implementing some embodiments of the present disclosure.

FIG. 2A a flowchart of a method 200 for optimizing and editing an extracted 3D model suitable for use in implementing some embodiments of the present disclosure. At step 210, the method 150 of FIG. 1B is completed to learn a 3D model from images of an object in an environment. At step 260, 2D textures are generated for the 3D model. Automatic texture parametrization for surface meshes is an active research area in computer graphics. Optimizing topology requires continually updating the parametrization, potentially introducing discontinuities into the training process. To robustly handle texturing during topology optimization, volumetric texturing is leveraged, and world space position is used to index into the texture stored in the spatially-varying material parameters 120. Using the world space position rather than the coordinates associated with vertex positions ensures that the mapping varies smoothly with both vertex translations and changing topology. However, the memory footprint of volumetric textures grows cubically, therefore a neural network may be used to encode all material parameters in a compact representation. The neural network representation can adaptively allocate detail near the 2D manifold representing the triangular surface mesh, which is a small subset of the dense 3D volume. More formally, the neural network learns a mapping $x \rightarrow (k_d, k_{orm},$ n), e.g., given a world space position x, computes the base color, $k_d$, specular parameters, $k_{orm}$ (roughness, metalness), and a tangent space normal perturbation, n.

Once the triangular mesh topology 104 and neural network texture representation stored in the spatially-varying material parameters 120 have converged, the 3D model is re-parametrized at step 260. In an embodiment, unique texture coordinates are generated and the neural network is sampled on the triangular surface mesh defined by the triangular mesh topology 104 to initialize the 2D textures. In an embodiment, only the world space coordinates are used to access the spatially-varying material parameters for construction of the 3D model at step 210. In an embodiment, after the triangular mesh topology 104 and the spatially-varying material parameters 120 have converged, the 3D model is reparameterized and coordinates of the 2D textures are used (instead of the world space coordinates) to access the spatially-varying material parameters during subsequent optimization of the 3D model.

Figure 3A:
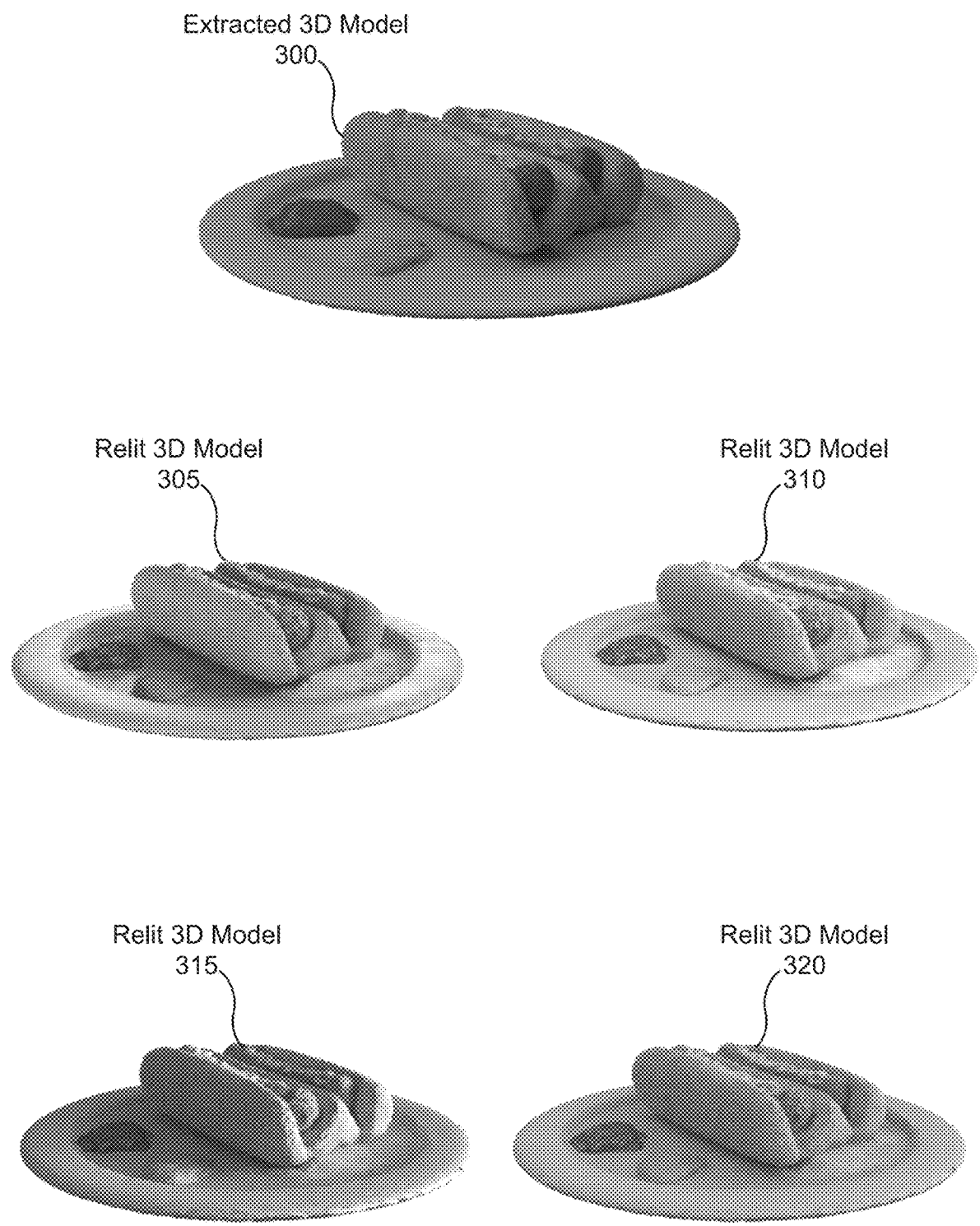
FIG. 3A illustrates relighting an extracted 3D model, in accordance with an embodiment.
Figure 3B:
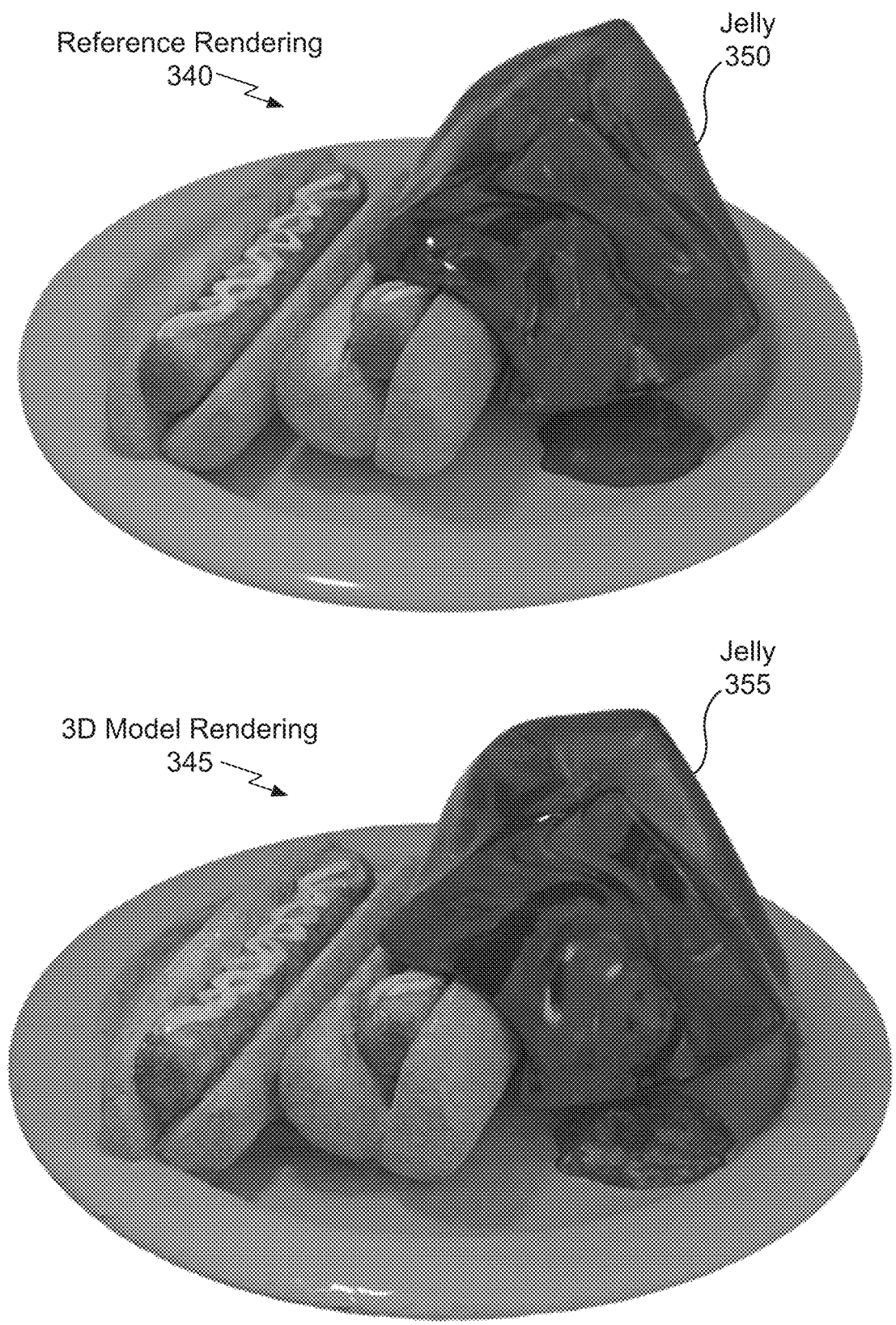
FIG. 3B illustrates scene editing using an extracted 3D model, in accordance with an embodiment.

At step 265, optimization is resumed using a fixed triangular mesh topology and the generated 2D textures. Training after reparameterization effectively removes texture seams introduced by the (u,v)-parametrization, and may also increase texture detail as high resolution 2D textures may be used for each of $k_d$, $k_{orm}$, and n. The resulting 2D textures are compatible with standard 3D tools and game engines and may be directly used by the 3D tools and game engines. At step 270, the 3D model and/or scene may be edited and/or the lighting may be changed, as shown in FIGS. 3A and 3B. In an embodiment, the 3D model is rendered in a scene with an additional object that interacts with the 3D model. In an embodiment, the 3D model is rendered in a scene with a light source that differs compared with the light source used during training.

Figure 2B:
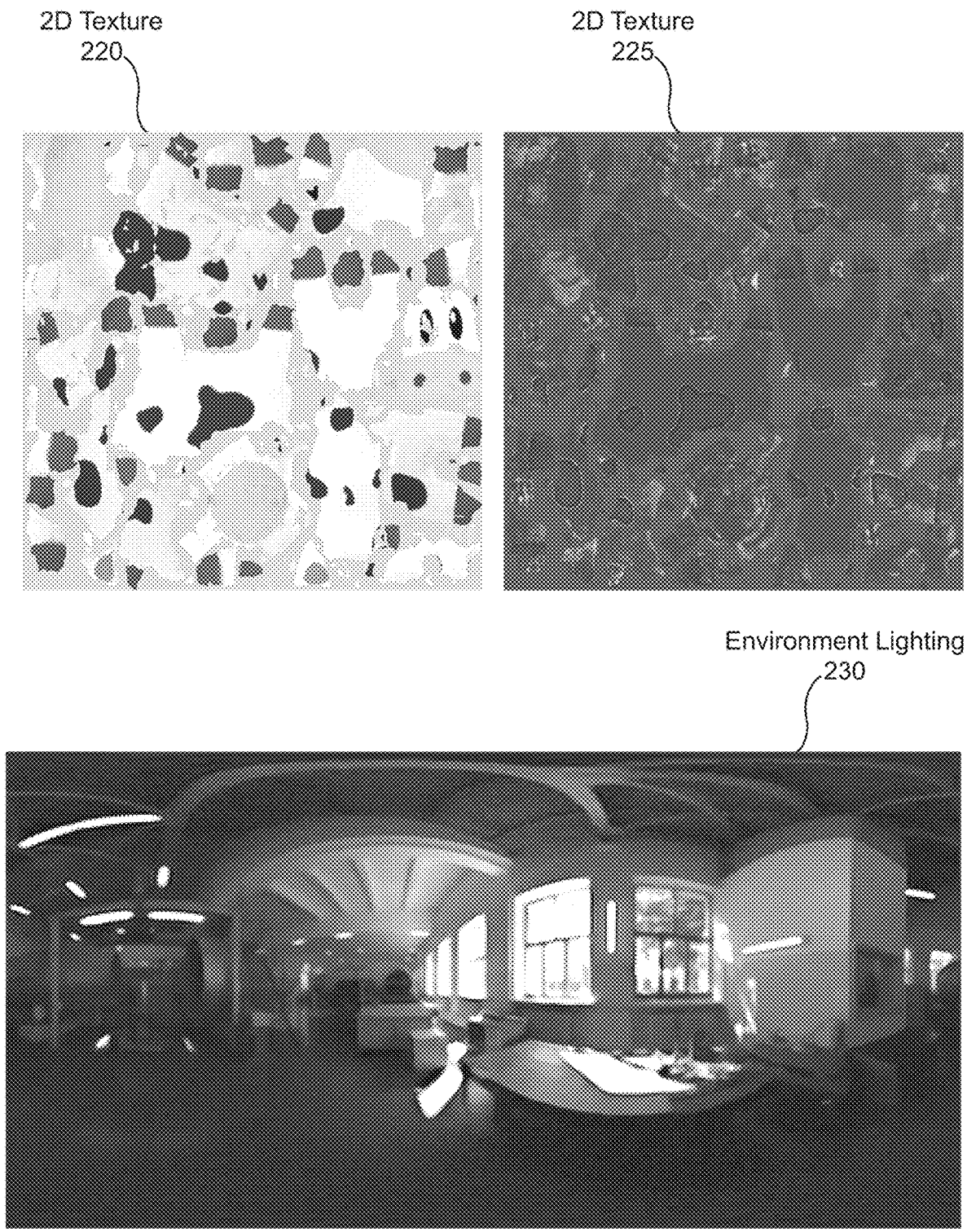
FIG. 2B illustrates learned materials and lighting, in accordance with an embodiment.

FIG. 2B illustrates learned materials and lighting, in accordance with an embodiment. A 2D texture 220 encodes base colors (spatially-varying parameters) $k_d$ for the triangular mesh topology 104. A 2D texture 225 encodes specular parameters $k_{orm}$ for the triangular mesh topology 104. The physically-based (PBR) material model implemented by the system 100 enables easy importation of game assets and the constructed 3D model may be directly rendered by existing engines without modifications. The material model combines a diffuse term with an isotropic, specular GGX lobe. The diffuse lobe parameters, base colors $k_d$ are provided as a four-component texture, where the optional fourth channel a represents transparency. The specular lobe is described by a roughness value, r, for the GGX normal distribution function and a metalness factor, m, which interpolates between plastic and metallic appearance by computing a specular highlight color according to $k_s = (1-m) \cdot 0.04 + m \cdot k_d$. Following a standard convention, these values may be stored by the spatially-varying material parameters 120 in a texture $k_{orm} = (o, r, m)$, where o is left unused. Finally, a tangent space normal map, n, may be included to capture high frequency shading detail. In an embodiment, the material parameters may be regularized using a smoothness loss.

Environment lighting 230 may also be learned and stored in the environment lighting parameters 125. In an embodiment, an image-based lighting model is used, where the scene environment light is given by a high-resolution cube map. Following the rendering equation, the outgoing radiance $L(\omega_o)$ may be computed in direction $\omega_o$ by:

$$L(\omega_o) = \int_\Omega L_i(\omega_i) f(\omega_i, \omega_o)(\omega_i \cdot n) d\omega_i \quad \text{eq. (3)}$$

The outgoing radiance is an integral of the product of the incident radiance, $L_i(\omega_i)$ from direction $\omega_i$ and the BSDF $f(\omega_i, \omega_o)$. The integration domain is the hemisphere $\Omega$ around the surface intersection normal, n.

Below, the specular part of the outgoing radiance is described, where the BSDF may be a Cook-Torrance microfacet specular shading model according to:

$$f(\omega_i, \omega_0) = \frac{DGF}{4(\omega_0 \cdot n)(\omega_i \cdot n)}, \quad \text{eq. (4)}$$

where D, G and F are functions representing the GGX normal distribution (NDF), geometric attenuation and Fresnel term, respectively.

High quality estimates of image-based lighting can be obtained by Monte Carlo integration. For low noise levels, large sample counts are required, which is typically too expensive for interactive applications. Thus, spherical Gaussians (SG) and spherical harmonics (SH) are common approximations for image-based lighting. SG and SH allow for control over the lighting frequency through varying the number of SG lobes (or SH coefficients), and are efficient representations for low to medium frequency lighting. However, representing high frequency and highly specular materials is challenging and requires many SG lobes, which comes at a high runtime cost and hurts training stability.

Therefore, a differentiable split sum approximation is developed to provide a very efficient method for all-frequency image based lighting. Here the lighting integral from Equation (3) is separated into two terms:

$$L(\omega_o) \approx \int_\Omega f(\omega_i, \omega_o)(\omega_i \cdot n) d\omega_i \int_\Omega L_i(\omega_i) D(\omega_i, \omega_o)(\omega_i \cdot n) d\omega_i \quad \text{eq. (5)}$$

The first term represents the integral of the specular BSDF with a solid white environment light. The first term only depends on the parameters $\cos \theta = \omega_i \cdot n$ and the roughness r of the BSDF, and can be precomputed and stored in a 2D texture.

The second term represents the integral of the incoming radiance with the specular NDF, D. The second term may also be pre-integrated and represented by a filtered cubemap. In each mip-level, the environment map is integrated against D for a fixed roughness value (increased roughness at smaller mips).

The split sum approach incurs a modest runtime cost, using only two texture lookups: query the 2D texture representing the first term based on (r, $\cos \theta$) and the mip pyramid at level r, in direction $\omega_o$. The split sum should be compared to evaluating SG products with hundreds of lobes for each shading point. Furthermore, the split sum uses the standard GGX parametrization, which means that the extracted 3D models can be relit with different kinds of light sources (point, area lights etc.) and the reconstructed materials can be used with no modifications in most game engines and modeling tools.

FIG. 3A illustrates relighting an extracted 3D model 300, in accordance with an embodiment. As shown in FIG. 3A, the extracted 3D model 300 is two hot dogs on a plate with condiments. The lighting for the extracted 3D model 300 is changed to produce rendered images of relit 3D models 305, 310, 315, and 320 that each have different appearances. To render each of the relit 3D models 305, 310, 315, and 320 the extracted triangular mesh topology and spatially-varying material parameters are not modified. Only the environment lighting parameters are changed to produce each rendered image of the relit 3D models 305, 310, 315, and 320.

The differentiable version of the split sum shading model is used to learn environment lighting from image observations through differentiable rendering. The texels of a cube map (typical resolution 6×512×512) may be used as the trainable parameters. A base level represents the pre-integrated lighting for the lowest supported roughness value, and each smaller mip-level may be constructed from the base level using a pre-filtering technique.

To obtain texel gradients, the image-based lighting computations may be expressed using PyTorch's auto-differentiation. However, the pre-filtering of the second term in Equation (5) must be updated in each training iteration, and therefore may warrant a specialized implementation to reduce the training cost. The second term can either be estimated through Monte-Carlo integration (BSDF importance sampling), or by pre-filtering the environment map in a solid-angle footprint derived from the NDF. The pre-filtering approach reduces noise, at the cost of introducing some bias. In an embodiment, a single filtered low-resolution (e.g., 6×16×16) cube map is also created that represents diffuse lighting. The process is identical to the filtered specular probe, sharing the same trainable parameters, average-pooled to the mip level with roughness r=1. The pre-filtering of the diffuse term only uses the cosine term $\omega_i \cdot n$. The two filtering steps are fully differentiable and are performed at each training iteration.

FIG. 3B illustrates scene editing using an extracted 3D model, in accordance with an embodiment. The extracted 3D models generated by the system 100 may accurately interact with scene lighting and may even cast shadows. The extracted 3D models may also interact with other objects in a scene. As shown in FIG. 3B, the extracted 3D model is two hot dogs on a plate with condiments and the 3D scene is edited to include jelly. A reference 3D model is rendered with jelly 350 to produce a reference rendering 340. The extracted 3D model (reconstructed hotdog) is used in a soft-body physics simulation, dropping red jelly 355 on the plate. The entire simulation (21 frames) is run on both the reference 3D model and the extracted 3D model, producing the last rendered frames as the reference rendering 340 and the 3D model rendering 345, respectively.

The 3D model generated by the 3D model extraction system 100 can be directly deployed in the vast collection of 3D content generation tools available for triangle meshes. The compatibility with existing tools greatly facilitates scene editing, which is still very challenging for neural volumetric representations. The extracted 3D models receive scene illumination, cast accurate shadows, and robustly act as colliders for virtual objects. The extracted 3D models may also be used in advanced scene editing, material decomposition, and high quality view interpolation, all running at interactive rates in triangle-based renderers (rasterizers and path tracers). Performing end-to-end optimization driven by appearance of the rendered 3D model and directly optimizing the triangular surface mesh of the 3D model enables construction of a high-quality 3D model. In contrast, conventional techniques fail to avoid errors introduced from mesh extraction through Marching Cubes. The 3D model extraction system 100 can be used as an appearance-aware converter from a (neural) volumetric or SDF representation to triangular 3D models with materials, complementing many conventional 3D model construction techniques.

Parallel Processing Architecture

Figure 4:
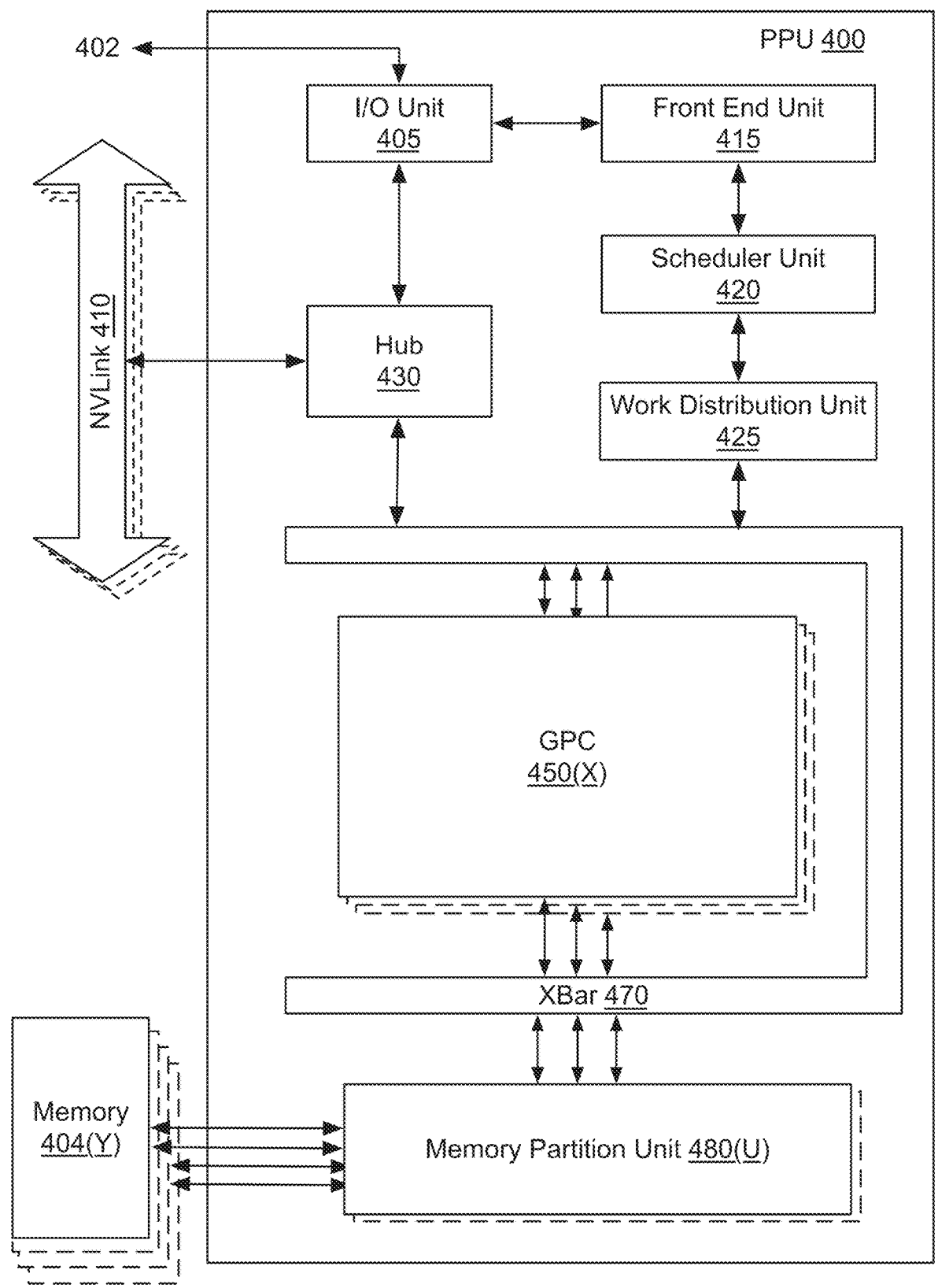
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the 3D model extraction system 100. The PPU 400 may be used to implement one or more of the topology construction unit 110, the rendering unit 115, the spatially-varying material parameters 120, the environment lighting parameters 125, and the image space loss unit 130. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
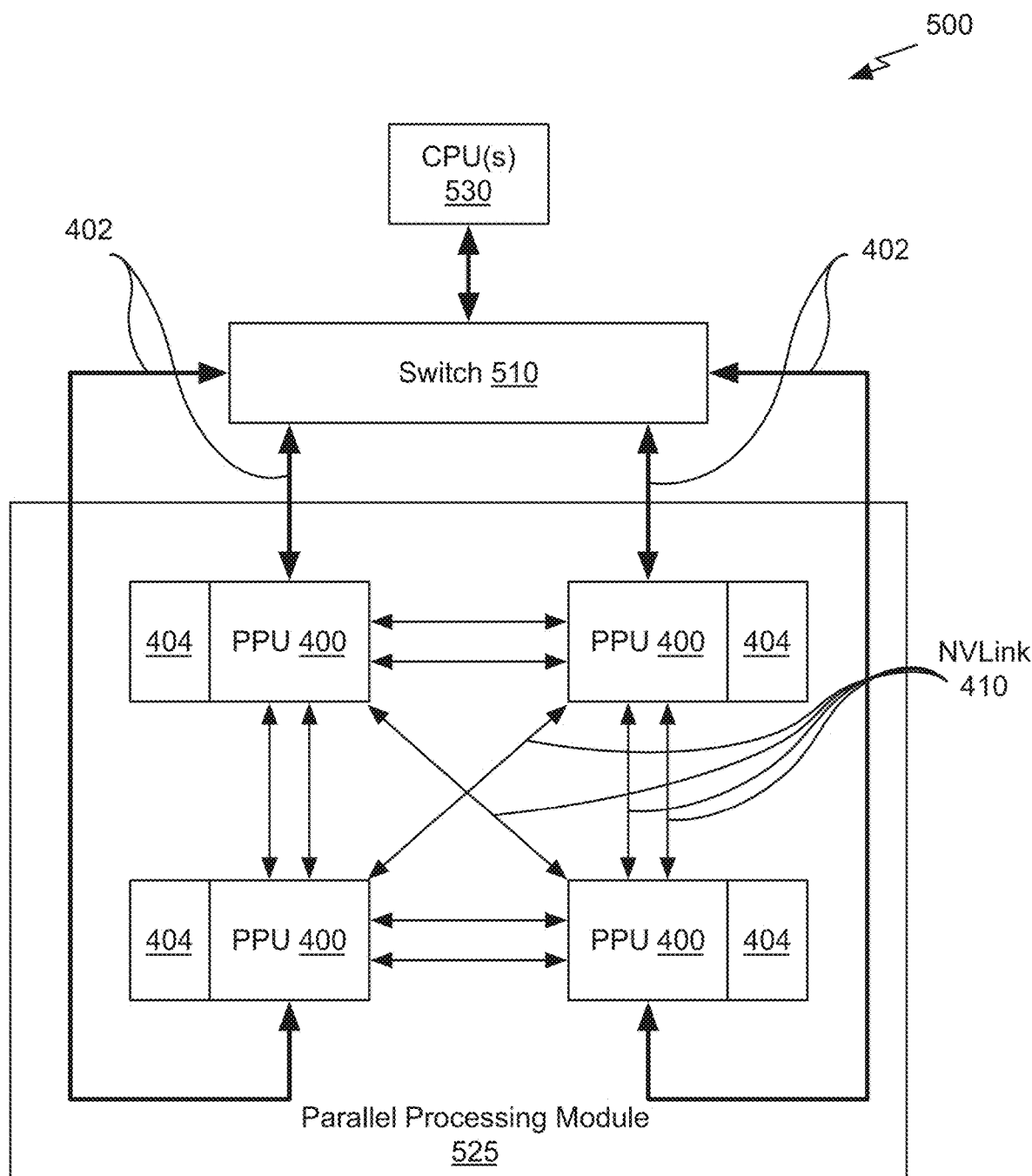
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement one or more of the methods 150 and 200, shown in FIGS. 1B and 2A, respectively. The processing system 500 includes a CPU 530, switch 510, and multiple PPUs 400, and respective memories 404.

Figure 5B:
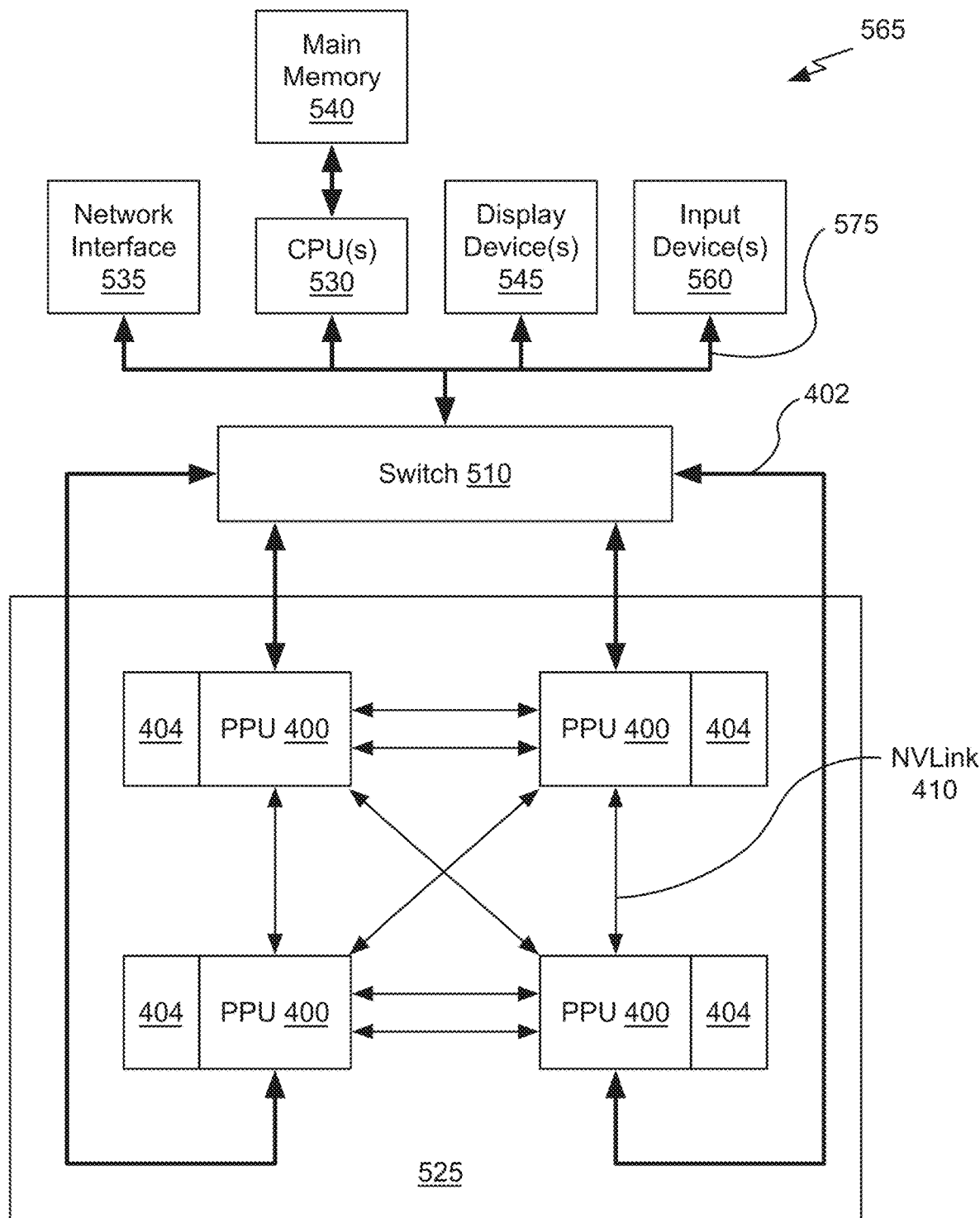
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the methods 150 and 200, shown in FIGS. 1B and 2A, respectively.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
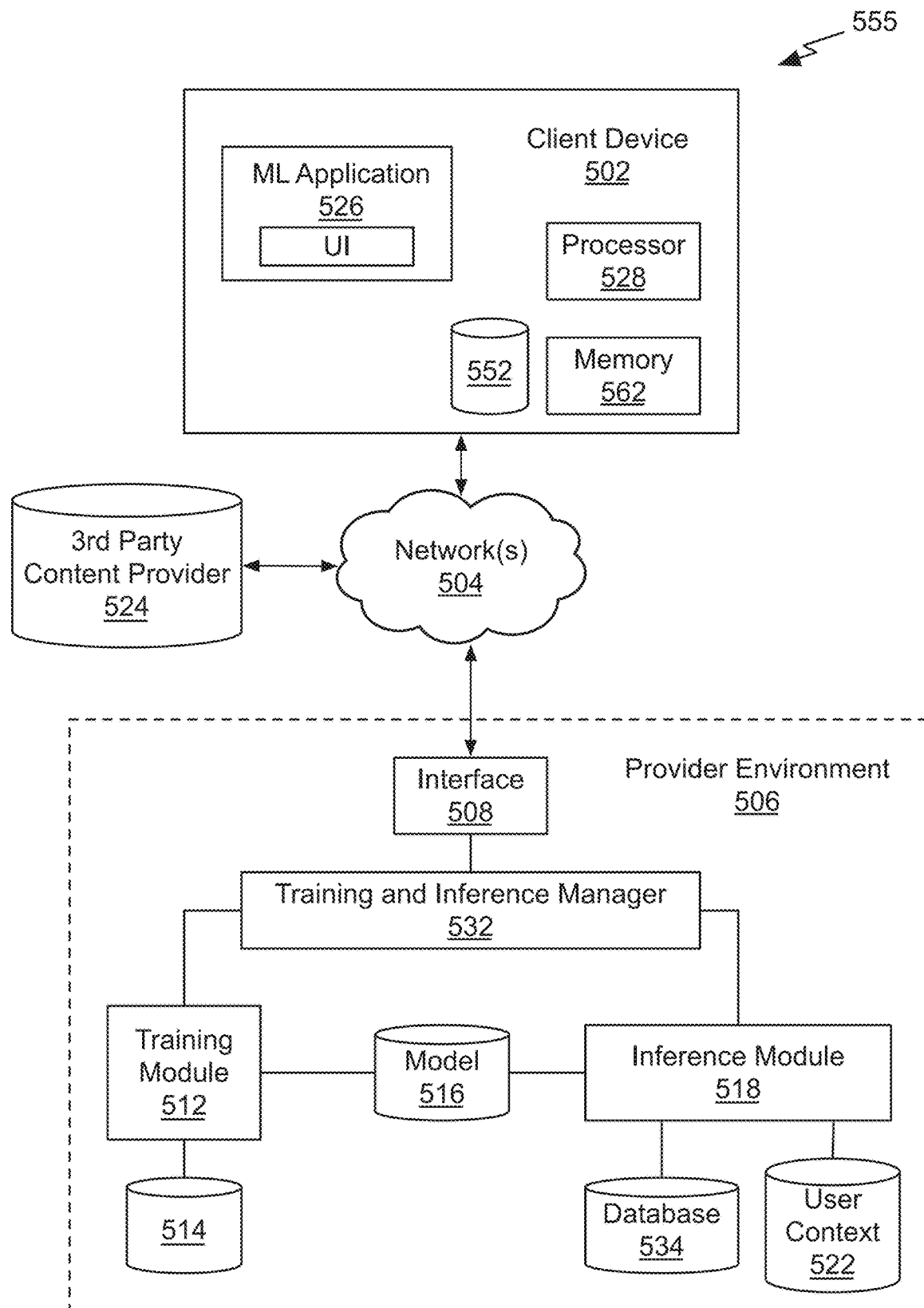
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
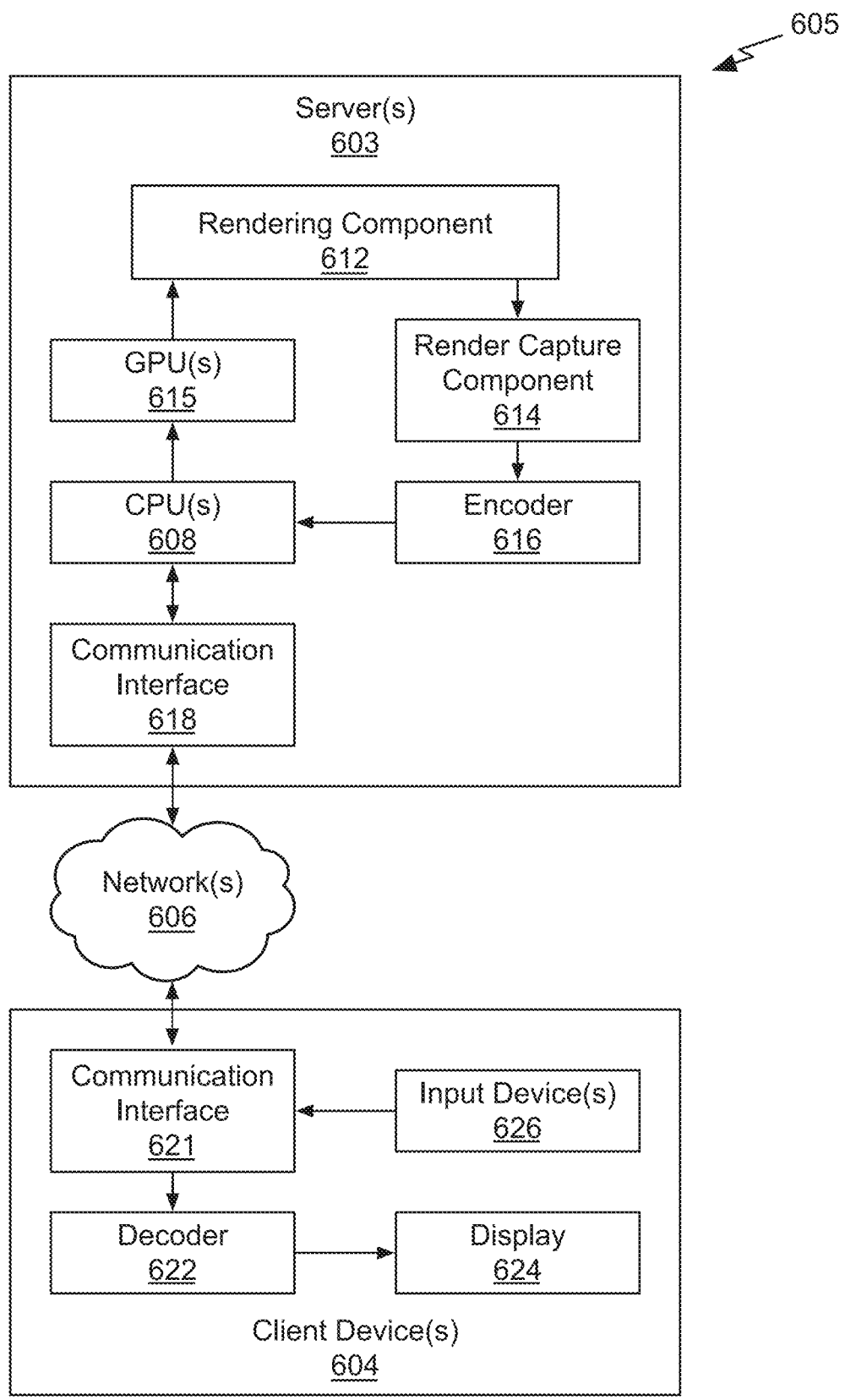
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for constructing a three-dimensional (3D) model, comprising:
   receiving images of an object in an environment;
   constructing a triangular mesh topology for the 3D model of the object in world space according to topology parameters that define positions;
   rendering the triangular mesh topology to produce rendered images of the 3D model, wherein the rendering comprises:
      accessing spatially-varying material parameters for the 3D model using world space coordinates; and
      computing lighting for the 3D model using environment lighting parameters;
   computing image space losses based on the images and the rendered images;
   updating the topology parameters by back-propagating topology gradients computed from the image space losses through rendering operations to modify the triangular mesh topology; and
   updating the spatially-varying material parameters by back-propagating material gradients computed from the image space losses through the rendering operations to modify the spatially-varying material parameters.

2. The computer-implemented method of claim 1, wherein the constructing comprises converting an initial uniform geometric grid defined by per-vertex 3D positions and the topology parameters into the triangular mesh topology.

3. The computer-implemented method of claim 2, wherein the initial uniform geometric grid is a tetrahedral grid.

4. The computer-implemented method of claim 1, wherein the topology parameters comprise vertex offsets assigned to each vertex of the triangular mesh topology, wherein vertex positions are fixed and the vertex offsets are updated to modify the triangular mesh topology.

5. The computer-implemented method of claim 1, wherein at least one triangle is removed from or inserted into the triangular mesh topology when the topology parameters are updated.

6. The computer-implemented method of claim 1, wherein the spatially-varying material parameters are encoded by a neural network that learns a mapping of world space positions to colors and specular parameters.

7. The computer-implemented method of claim 6, further comprising, after the topology parameters and the spatially-varying material parameters are converged, reparameterizing the spatially-varying material parameters to use texture coordinates instead of world space coordinates by sampling the spatially-varying material parameters on a surface of the triangular mesh topology to generate two-dimensional (2D) texture maps that replace the neural network.

8. The computer-implemented method of claim 7, further comprising rendering the triangular mesh topology to produce additional rendered images of the 3D model by a differentiable renderer using the 2D texture maps.

9. The computer-implemented method of claim 8, further comprising updating the 2D texture maps by back-propagating texel gradients computed from the image space losses through the differentiable renderer pipeline.

10. The computer-implemented method of claim 1, further comprising updating the environment lighting parameters by back-propagating lighting gradients computed from the image space losses through rendering operations to modify the environment lighting parameters.

11. The computer-implemented method of claim 10, wherein the environment lighting parameters comprise integrals of diffuse and specular bidirectional scattering distribution function and integrals of incoming radiance associated with lighting directions.

12. The computer-implemented method of claim 10, further comprising:
   modifying the environment lighting parameters according to a light source that differs compared with the environment; and
   rendering the 3D model using the modified environmental lighting parameters.

13. The computer-implemented method of claim 1, wherein an additional supervision input corresponding to the object is provided for each image of the images and used to construct the triangular mesh topology for the 3D model of the object.

14. The computer-implemented method of claim 13, wherein the additional supervision input comprises one of a foreground segmentation mask or a depth field.

15. The computer-implemented method of claim 1, further comprising rendering the 3D model in a scene with an additional object that interacts with the 3D model.

16. The computer-implemented method of claim 1, further comprising repeating the constructing and rendering using additional images of the object in the environment at a different pixel resolution compared with the images to construct a version of the 3D model at an additional resolution.

17. The computer-implemented method of claim 1, wherein a neural network model generates the topology parameters that are used to construct the triangular mesh topology for the 3D model of the object.

18. The computer-implemented method of claim 1, wherein at least one of the steps of constructing and rendering are performed on a server or in a data center to generate the 3D model, and the 3D model is streamed to a user device.

19. The computer-implemented method of claim 1, wherein at least one of the steps of constructing and rendering are performed within a cloud computing environment.

20. The computer-implemented method of claim 1, wherein the 3D model is constructed for training, testing, or certifying a neural network employed in a machine, robot, or autonomous vehicle.

21. The computer-implemented method of claim 1, wherein at least one of the steps of constructing and rendering is performed on a virtual machine comprising a portion of a graphics processing unit.

22. A system, comprising:
   a memory that stores images of an object in an environment; and
   a processor that is connected to the memory, wherein the processor configured to construct a three-dimensional (3D) model by:
      constructing a triangular mesh topology for the 3D model of the object in world space according to topology parameters that define positions;
      rendering the triangular mesh topology to produce rendered images of the 3D model, wherein the rendering comprises:
         accessing spatially-varying material parameters for the 3D model using world space coordinates; and
         computing lighting for the 3D model using environment lighting parameters;
      computing image space losses based on the images and the rendered images;
      updating the topology parameters by back-propagating topology gradients computed from the image space losses through rendering operations to modify the triangular mesh topology; and
      updating the spatially-varying material parameters by back-propagating material gradients computed from to the image space losses through rendering operations to modify the spatially-varying material parameters.

23. The system of claim 22, wherein at least one triangle is removed from or inserted into the triangular mesh topology when the topology parameters are updated.

24. A non-transitory computer-readable media storing computer instructions for constructing a three-dimensional (3D) model that, when executed by one or more processors, cause the one or more processors to perform the steps of:
   receiving images of an object in an environment;
   constructing a triangular mesh topology for the 3D model of the object in world space according to topology parameters that define positions;
   rendering the triangular mesh topology to produce rendered images of the 3D model, wherein the rendering comprises:
      accessing spatially-varying material parameters for the 3D model using world space coordinates; and
      computing lighting for the 3D model using environment lighting parameters;
   computing image space losses based on the images and the rendered images;
   updating the topology parameters by back-propagating topology gradients computed from the image space losses through rendering operations to modify the triangular mesh topology; and
   updating the spatially-varying material parameters by back-propagating material gradients computed from the image space losses through rendering operations to modify the spatially-varying material parameters.

25. The non-transitory computer-readable media of claim 24, further comprising instructions for:
   modifying environment lighting parameters according to a light source that differs compared with the environment; and
   rendering the 3D model using the modified environmental lighting parameters.

* * * * *